United States Patent
Li et al.

(10) Patent No.: US 12,034,110 B2
(45) Date of Patent: Jul. 9, 2024

(54) LAMINATING EQUIPMENT, METHOD AND LAMINATED STRUCTURE

(71) Applicant: SHENZHEN GEESUN INTELLIGENT TECHNOLOGY CO., LTD., Shenzhen (CN)

(72) Inventors: Panpan Li, Shenzhen (CN); Longlong Zuo, Shenzhen (CN); Rukun Yang, Shenzhen (CN)

(73) Assignee: SHENZHEN GEESUN INTELLIGENT TECHNOLOGY CO., LTD., Guangdong (CN)

( * ) Notice: Subject to any disclaimer, the term of this patent is extended or adjusted under 35 U.S.C. 154(b) by 211 days.

(21) Appl. No.: 17/337,561

(22) Filed: Jun. 3, 2021

(65) Prior Publication Data

US 2022/0123349 A1 Apr. 21, 2022

(30) Foreign Application Priority Data

Oct. 20, 2020 (CN) .......................... 202011129839.7

(51) Int. Cl.
| | |
|---|---|
| H01M 10/04 | (2006.01) |
| H01M 10/0525 | (2010.01) |
| H01M 10/0583 | (2010.01) |

(52) U.S. Cl.
CPC ..... *H01M 10/045* (2013.01); *H01M 10/0404* (2013.01); *H01M 10/0525* (2013.01); *H01M 10/0583* (2013.01)

(58) Field of Classification Search
None
See application file for complete search history.

(56) References Cited

U.S. PATENT DOCUMENTS

2004/0154160 A1* 8/2004 Hong ................ H01M 10/0583
29/730
2019/0237797 A1 8/2019 Cho et al.

FOREIGN PATENT DOCUMENTS

| CN | 110459796 A | 11/2019 |
|---|---|---|
| CN | 108736033 B | 12/2019 |
| CN | 111430773 A | 7/2020 |
| CN | 111653832 A | 9/2020 |
| EP | 3242346 B1 | 12/2018 |

(Continued)

OTHER PUBLICATIONS

WO-2019242102-A1—Machine Translation (Year: 2019).*
KR20170059739A—Machine Translation (Year: 2017).*
First Office Action for the Korean Patent Application No. 10-2021-0074075 issued by the Korean Intellectual Property Office on Apr. 3, 2023.
First Office Action for the Japanese Patent Application No. 2021-093518 issued by the Japanese Patent Office on Jun. 21, 2022.
Second Office Action for the Japanese Patent Application No. 2021-093518 issued by the Japanese Patent Office on Feb. 1, 2023.
European Search report of European Patent Application No. 21175443.7 issued by the European Patent Office on Nov. 4, 2021.

(Continued)

*Primary Examiner* — Brian R Ohara
*Assistant Examiner* — Patrick Marshall Greene
(74) *Attorney, Agent, or Firm* — IP & T GROUP LLP

(57) ABSTRACT

The present disclosure provides laminating equipment, method and a laminated structure, and relates to the technical field of jelly roll manufacturing. The laminating equipment includes a transferring mechanism and a carrying mechanism. The transferring mechanism is configured to transfer a composite bi-cell belt downward, wherein the composite bi-cell belt has thereon a plurality of composite bi-cell units, and two adjacent composite bi-cell units are connected to each other through a bending section. The carrying mechanism has a laminating plane, and the plurality of composite bi-cell units are laminated one by one on the laminating plane, thereby forming a laminated structure.

17 Claims, 5 Drawing Sheets

(56) References Cited

FOREIGN PATENT DOCUMENTS

| | | |
|---|---|---|
| EP | 3477755 A1 | 5/2019 |
| JP | 4823393 B | 7/1973 |
| JP | 2000164243 A | 6/2000 |
| JP | 2010102871 A | 5/2010 |
| JP | 2012190697 A | 10/2012 |
| JP | 2013222601 A | 10/2013 |
| JP | 2017162767 A | 9/2017 |
| JP | 2019215976 A | 12/2019 |
| KR | 20170059739 A | 5/2017 |
| KR | 102023530 B1 | 9/2019 |
| WO | 2013128930 A1 | 9/2013 |
| WO | WO-2019242102 A1 * 12/2019 | ........... H01G 13/003 |

OTHER PUBLICATIONS

First Office Action for the European Patent Application No. 21175443.7 issued by the European Patent Office on Nov. 17, 2021.
First Office Action for the Indian Patent Application No. 202124025021 issued by the Indian Patent Office on Jun. 10, 2022.
Decision to Grant a Patent of the Russian Patent Application No. 2021116101/07 by the Russian Patent Office on Dec. 9, 2021.
Decision to Grant Japanese Patent Application No. 2021-093518 issued by the Japanese Patent Office on Jul. 21, 2023.
Decision to Grant Korean Patent Application No. 10-2021-0074075 issued by the Japanese Patent Office on Oct. 5, 2023.

* cited by examiner

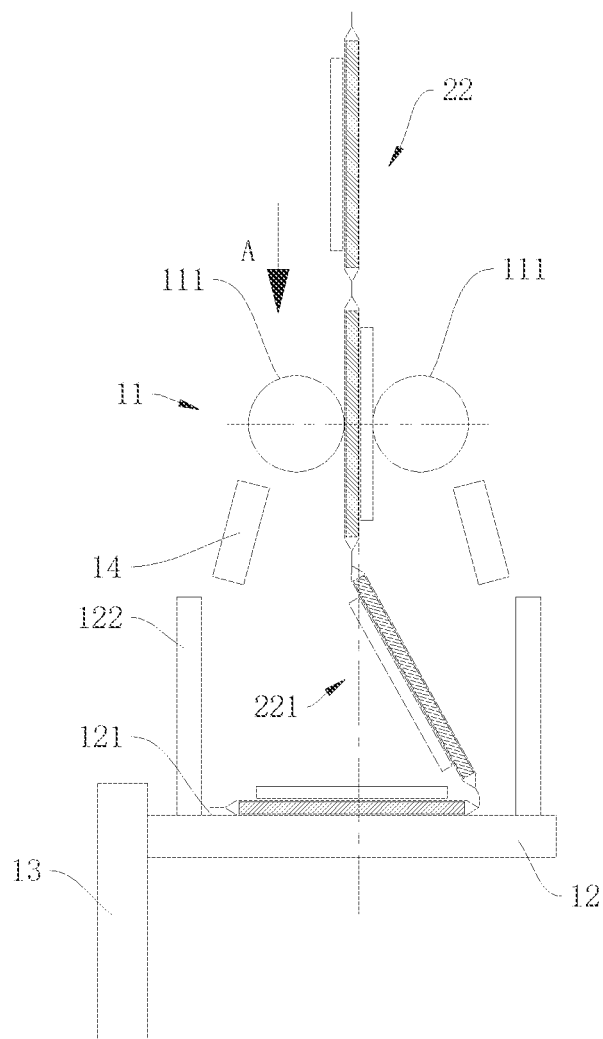

FIG. 3

```
conveying the composite electrode piece
belt downward to the laminating plane, so      S100
  that a plurality of composite electrode
   piece units are successively laminated on
 the laminating plane and thus a laminated
               structure is formed
```

```
moving the laminated plane downward, to keep    S200
  a constant distance between the composite
 electrode piece unit on the top of the laminated
    structure on the laminated plane and the
              conveying mechanism
```

FIG. 4

LAMINATING EQUIPMENT, METHOD AND LAMINATED STRUCTURE

CROSS-REFERENCE TO RELATED APPLICATIONS

This disclosure claims priority to Chinese Patent Application No. 202011129839.7 filed with the Chinese Patent Office on Oct. 20, 2020, entitled "Laminating Equipment, Method and Laminated structure", which is incorporated herein by reference in its entirety.

TECHNICAL FIELD

The present disclosure relates to the technical field of battery jelly roll manufacturing, in particular, to laminating equipment, method and a laminated structure.

BACKGROUND ART

Currently, the jelly roll of lithium-ion battery mainly has a winding structure and a laminated structure, wherein the laminated structure is to sequentially laminate sheet-shaped cathode piece, anode piece and separator, to form jelly roll. However, the efficiency of current laminating processes is low.

In view of this, it is particularly important to research, develop and design laminating equipment, method and a laminated structure that can solve the above technical problem.

SUMMARY

The present disclosure provides a technical solution as follows:

the embodiments of the present disclosure provide a laminating equipment that comprises a transferring mechanism and a carrying mechanism, wherein the transferring mechanism is configured to transfer a composite bi-cell belt downward, wherein the composite bi-cell belt has thereon a plurality of composite bi-cell units arranged sequentially with an interval there between, and two adjacent composite bi-cell units are connected to each other through a bendable bending section, and the composite bi-cell unit comprises a separator belt, a first electrode, another separator belt, and a second electrode that are arranged sequentially overlapping one another; the carrying mechanism has a laminating plane which is configured to carry the composite bi-cell units, so that the plurality of the composite bi-cell units are laminated one by one on the laminating plane, thereby forming a laminated structure, and in the laminated structure the first electrode in any one of the composite bi-cell units is adjacent to the second electrode in another adjacent composite bi-cell unit.

The embodiment of the present disclosure provides a laminating method which is applied to the laminating equipment, and the laminating method comprises transferring the composite bi-cell belt downward to the laminating plane, so that the plurality of composite bi-cell units are successively laminated on the laminating plane, so as to form a laminated structure.

The embodiment of the present disclosure further provides a laminated structure which is applied to the laminating equipment, and the laminated structure comprises the composite bi-cell belt which comprises two separator belts, multiple first electrode and multiple second electrode; the multiple first electrode is all disposed between the two separator belts and disposed with an interval there between along the extending direction of the separator belts; the multiple second electrode are alternately arranged on the respective sides of the two separator belts away from the first electrode, and the multiple second electrode correspond to the multiple first electrode one by one, so that the first electrode and the corresponding second electrode form the composite bi-cell units. There is an interval between adjacent composite bi-cell units, and the section of the separator belt corresponding to the interval is a bending section, and the bending section can be bent so as to be configured to be bent when the plurality of the composite bi-cell units are successively folded.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation to the scope, and those ordinarily skilled in the art still could obtain other relevant drawings according to these accompanying drawings, without using any inventive effort.

FIG. 3 is a structural schematic view of the laminating equipment provided in the embodiment of the present disclosure when it performs the laminating operation in the state that the transferring mechanism is relatively close to the carrying mechanism;

FIG. 4 is a schematic view of a flow of the laminating method provided in the embodiment of the present disclosure;

Figure 1:
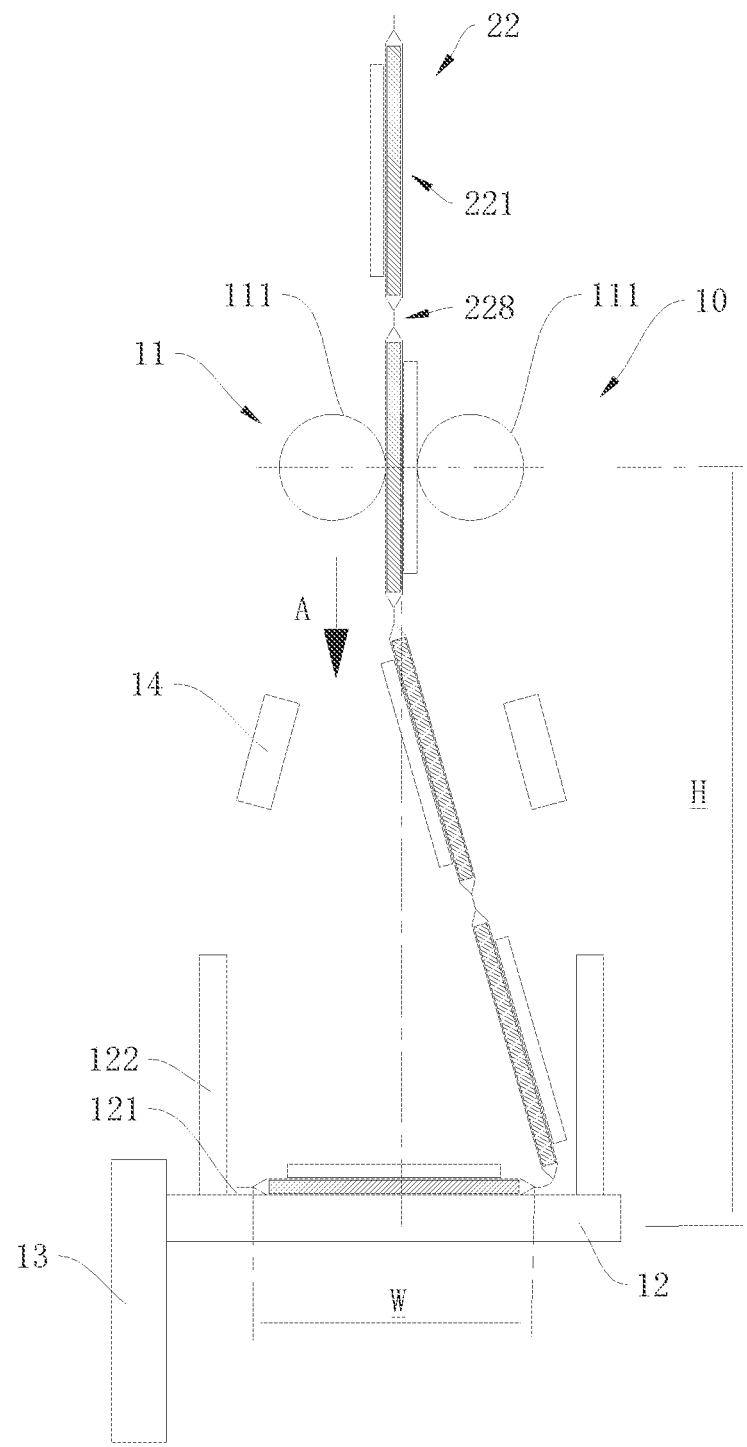
FIG. 1 is a structural schematic view of the laminating equipment provided in the embodiment at the beginning of the laminating operation.

Reference signs: 20—laminated structure; 22—composite bi-cell belt; 221—composite bi-cell unit; 222—separator belt; 226—first electrode; 227—second electrode; 228—bending section; 10—laminating equipment; 11—transferring mechanism; 111—transferring roller; 12—carrying mechanism; 121—laminating plane; 122—rib; 13—lifting mechanism; 12—guiding element; A—first direction; B—right swing center; L—left swing center; C—lamination center.

DETAILED DESCRIPTION OF EMBODIMENTS

In order to make clearer of purposes, technical solutions and advantages of the embodiments of the present disclosure, the technical solutions in the embodiments of the present disclosure will be described clearly and completely below in conjunction with accompanying drawings in the embodiments of the present disclosure. Obviously, the described embodiments are only a part of the embodiments of the present disclosure instead of all the embodiments. Usually, the assemblies of the embodiments of the present disclosure described and illustrated in the accompanying drawings herein can be arranged and designed through different arrangements.

It should be noted that the same reference signs and letters in the following accompanying drawings indicate the same terms, and therefore, as along as a term is defined in a figure, it need not be further defined or explained in the figures thereafter. The orientation or position relations indicated by the terms "upper", "lower", "inner", "outside", "left", "right" and the like are based on the orientation or position relations shown in the accompanying drawings, or are the orientation or position relations commonly arranged when the product according to the present disclosure is used, or are orientation or position relations usually understood by a person skilled in the art, and they are just intended to conveniently describe the present disclosure and simplify the description, and are not intended to indicate or imply that the devices or elements as indicated should have specific orientations or should be configured and operated in a specific orientations, and then should be construed as limitations to the present disclosure. The terms "first", "second" and the like are only intended for differentiated description and shall not be construed to indicate or imply relative importance. The terms "comprise", "contain" or any other variant is intended to cover non-exclusive inclusions, so that a process, method, article or device comprising a series of elements comprises not only those elements, but also other elements not explicitly listed, or further comprises elements inherent to this process, method, article or device. In the case of no more restrictions, the element defined by the phrase "comprise a . . ." shall not exclude that there still exists other identical elements in the process, method, article, or device that comprises the element.

It should also be noted that, unless otherwise clearly specified and defined, terms "dispose", "connect" and the like should be understood in a broad sense, for example, the term "connect" can be a fixed connection, a detachable connection, or an integral connection; it can be a mechanical connection or an electrical connection; it can be a direct connection or an indirect connection through an intermediate medium, and it can be the internal communication between two elements. For a person skilled in the art, they may understand the specific meaning of the above-mentioned terms in the present disclosure according to specific circumstances.

The present disclosure provides laminating equipment, method and a laminated structure, which can solve the problems of low laminating efficiency and poor laminating quality.

The present disclosure provides a technical solution as follows:

the embodiments of the present disclosure provide a laminating equipment that comprises a transferring mechanism and a carrying mechanism, wherein the transferring mechanism is configured to transfer a composite bi-cell belt downward, wherein the composite bi-cell belt has thereon a plurality of composite bi-cell units arranged sequentially with an interval therebetween, and two adjacent composite bi-cell units are connected to each other through a bendable bending section, and the composite bi-cell unit comprises a separator belt, a first electrode, another separator belt, and a second electrode that are arranged sequentially overlapping one another; the carrying mechanism has a laminating plane which is configured to carry the composite bi-cell units, so that the plurality of the composite bi-cell units are laminated one by one on the laminating plane, thereby forming a laminated structure, and in the laminated structure the first electrode in any one of the composite bi-cell units is adjacent to the second electrode in another adjacent composite bi-cell unit.

Optionally, the transferring mechanism comprises two transferring rollers disposed adjacent to each other, and the two transferring rollers are configured to transfer the composite bi-cell units to the laminating plane along a first direction; and the distance H from the position where the transferring rollers contact the composite bi-cell units to the laminating plane in the first direction is greater than or equal to $$\frac{\sqrt{15}}{2}W,$$

wherein W is the width of the composite bi-cell units.

Optionally, the transferring mechanism comprises two transferring rollers disposed adjacent to each other, and the two transferring rollers are configured to transfer the composite bi-cell units along the first direction; and the composite bi-cell units are flexible, and the distance H from the position where the transferring rollers contact the composite bi-cell units to the laminating plane in the first direction is greater than or equal to $$\frac{\sqrt{3}}{2}W,$$

wherein W is the width of the composite bi-cell units.

Optionally, the direction along which the transferring mechanism transfers the composite bi-cell belt is the first direction, and the first direction is perpendicular to the laminating plane.

Optionally, the center line of the laminated structure in the first direction passes through the center of the laminating plane.

Optionally, the laminating equipment further comprises a lifting mechanism which is connected with the carrying mechanism; and the lifting mechanism is configured to drive the carrying mechanism to move in a vertically downward direction, so that the distance between the composite bi-cell unit on the top of the laminated structure and the transferring mechanism keeps constant.

Optionally, the entirety of the transferring mechanism can move in a vertically upward direction, so that the distance between the composite bi-cell unit on the top of the laminated structure and the transferring mechanism keeps constant.

Optionally, the laminating equipment further comprises a guiding element that is disposed between the transferring mechanism and the laminating plane, and the guiding element is configured to guide the composite bi-cell units to bend relative to the bending section.

Optionally, the guiding element can move in the direction close to the composite bi-cell belt so as to help two adjacent composite bi-cell units bend relative to each other.

Optionally, the laminating equipment further comprises an absorbing element which is disposed on the laminating plane and configured to adsorb the composite bi-cell units.

Optionally, the laminating equipment further comprises ribs which are disposed on the carrying mechanism and located at the edge of the laminating plane, and the ribs are configured to restrict the composite bi-cell units located on the laminating plane from moving out of the laminating plane.

Optionally, the number of the ribs is two, which are disposed with an interval therebetween, and the laminating plane is located between the two ribs.

The embodiment of the present disclosure provides a laminating method which is applied to the laminating equipment, and the laminating method comprises transferring the composite bi-cell belt downward to the laminating plane, so that the plurality of composite bi-cell units are successively laminated on the laminating plane, so as to form a laminated structure.

Optionally, the laminating method further comprises moving the laminating plane downward to keep the distance between the composite bi-cell unit on the top of the laminated structure and the transferring mechanism constant.

The embodiment of the present disclosure further provides a laminated structure which is manufactured by the laminating equipment, and the laminated structure consists of the composite bi-cell belt which comprises two separator belts, multiple first electrodes and multiple second electrodes; the multiple first electrodes are all disposed between the two separator belts and disposed with an interval therebetween along the extending direction of the separator belts; the multiple second electrodes are alternately arranged on the respective sides of the two separator belts away from the first electrodes, and the multiple second electrodes correspond to the multiple first electrodes one by one, so that the first electrodes and the corresponding second electrodes form the composite bi-cell units. There is an interval between adjacent composite bi-cell units, and the section of the separator belt corresponding to the interval is a bending section, and the bending section can be bent so as to be configured to be bent when the plurality of the composite bi-cell units are successively folded.

Optionally, in the height direction of the laminated structure, the first electrode in any one of the composite bi-cell units is attached to the second electrode of the adjacent composite bi-cell units.

Optionally, the width of the first electrode is greater than that of the second electrode, and the projection of the second electrode on the first electrode is located within the outer contour of the first electrode. Optionally, the range of the length $\delta 1$ of the bending section is $\sqrt{(W1-W2)^2+(Ts+Ta+Tc)^2}+3Ts+Ta > \delta 1 > 4\ Ts+2Ta+Tc+B$,
wherein W1 is the width of the first electrode, W2 is the width of the second electrode, Ta is the thickness of the first electrode, Tc is the thickness of the second electrode, and Ts is the thickness of the separator belt, wherein the width of the first electrode indicates the distance between the two ends of the first electrode in the extending direction of the corresponding separator belt, the width of the second electrode indicates the distance between the two ends of the second electrode in the extending direction of the corresponding separator belt, and B is the precision of the bending section.

Compared with the prior art, the laminating equipment provided by the embodiment of the present disclosure achieves following advantageous effects, for example, the laminating equipment comprises the transferring mechanism and the carrying mechanism, wherein the transferring mechanism is configured to transfer the composite bi-cell belt downward, wherein the composite bi-cell belt has thereon a plurality of composite bi-cell units arranged sequentially with an interval therebetween, and two adjacent composite bi-cell units are connected to each other through the bendable bending section. Moreover, the carrying mechanism has a laminating plane which is configured to carry the composite bi-cell units, so as to laminate the composite bi-cell belt on the laminating plane, so that the plurality of composite bi-cell units are successively laminated on the laminating plane, so as to form the laminated structure.

In the process that the transferring mechanism transfers the composite bi-cell belt to the laminating plane, the composite bi-cell units in the composite bi-cell belt will sequentially and gradually get close to the laminating plane, and when one of the composite bi-cell units on the composite bi-cell belt is placed on the laminating plane, another composite bi-cell unit thereon is bent toward the composite bi-cell unit on the laminating plane and attached to the composite bi-cell unit on the laminating plane, to form a laminated structure of two pieces of composite bi-cell units by laminating. Then, another composite bi-cell unit connected to the composite bi-cell unit on the top of the laminated structure through the bending section is also folded toward the composite bi-cell unit located on the top of the laminated structure, thereby sequentially laminating multiple composite bi-cell units, then completing the laminating operation, and thus a laminated structure with multiple composite bi-cell units is formed.

In addition, since each of the composite bi-cell units comprises a separator belt, a first electrode, another separator belt, and a second electrode that are arranged sequentially overlapping one another. In the same composite bi-cell belt, the two second electrodes in two adjacent composite bi-cell units are respectively located at the different sides of the respective first electrodes, so that the first electrode of any one of the composite bi-cell units in the laminated structure is adjacent to the second electrode in another adjacent composite bi-cell unit. The laminating operation utilizes the bending of the bending section between adjacent composite bi-cell units, and multiple composite bi-cell units are folded one by one under the action of their own gravity and driven by the transferring mechanism, and the efficiency of the laminating operation is relatively high, and it will not easily cause deformation of the composite bi-cell units, and thus the laminating quality is high.

The advantageous effect of the laminating method and the laminated structure provided by the embodiments of the present disclosure with respect to the prior art is the same as that of the aforementioned laminating equipment with respect to the prior art, and thus are not repeated here.

The embodiments of the present disclosure are described hereafter in details in conjunction with accompanying drawings.

Figure 2:
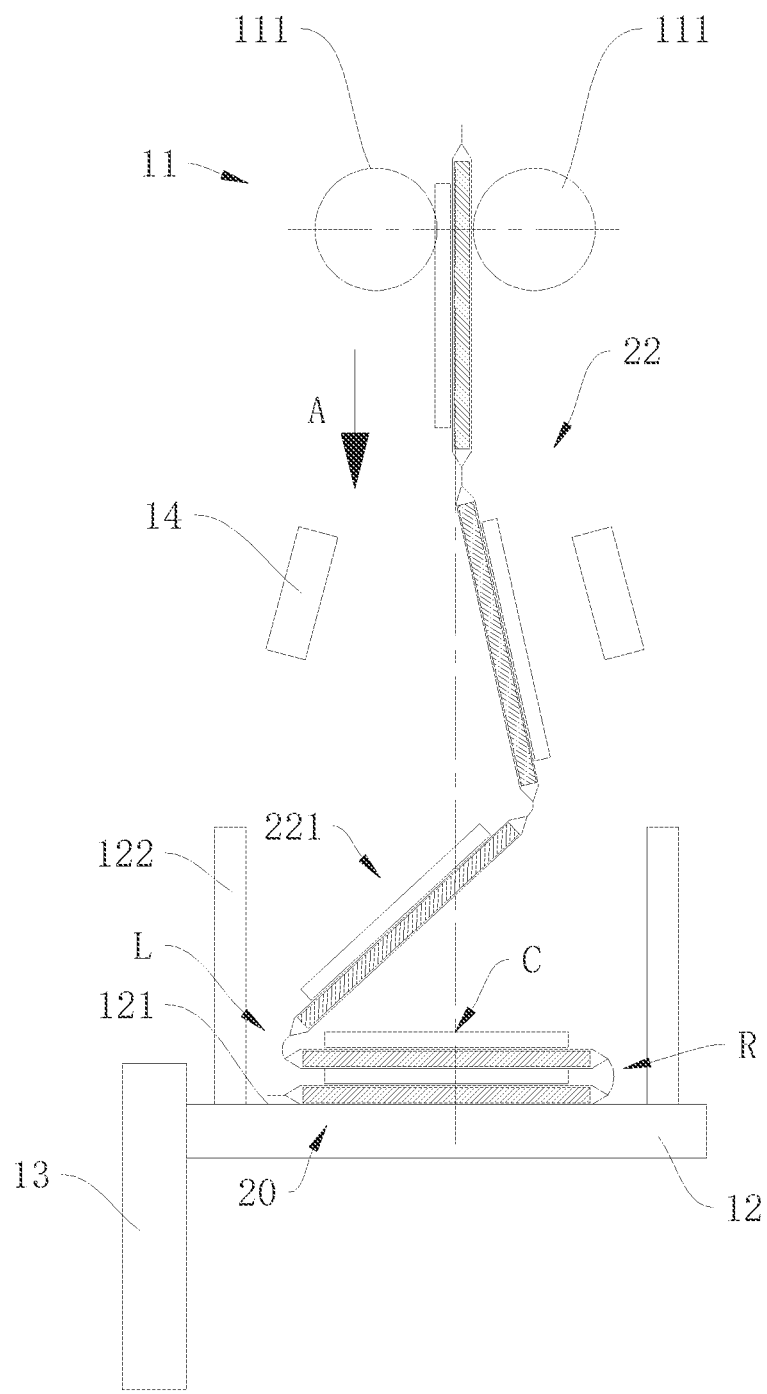
FIG. 2 is a structural schematic view of the laminating equipment provided in the embodiment of the present disclosure during the laminating operation process.

Referring to FIGS. 1, 2 and 3, FIG. 1 is a structural schematic view of the laminating equipment 10 when it starts the laminating operation provided in the embodiment of the present disclosure. FIG. 2 is a structural schematic view of the laminating equipment 10 during the laminating operation provided in the embodiment of the present disclosure. Here, the direction indicated by arrow A is the first direction A, arrow R indicates the right swing center R, arrow L indicates the left swing center L, and C is the lamination center C.

The present embodiment provides a laminating equipment 10 which is configured to fold the composite bi-cell belt 22, and it has the advantages of high lamination efficiency and good lamination quality. The laminating equipment 10 can be applied to scenes of a laminating system, a jelly roll production line and the like. Undoubtedly, the laminating equipment 10 can also be used independently.

The following is a detailed introduction to the structural composition, operating principle and advantageous effect of the laminating equipment 10.

Still referring to FIGS. 1 and 2, the laminating equipment 10 comprises a transferring mechanism 11 and a carrying mechanism 12, wherein the transferring mechanism 11 is configured to transfer a composite bi-cell belt 22 downward. A plurality of composite bi-cell units 221 are disposed sequentially with an interval therebetween on the composite bi-cell belt 22, and two adjacent composite bi-cell units 221 are connected by a bendable bending section 228, in other words, the composite bi-cell belt 22 is formed by a plurality of composite bi-cell units 221 and a plurality of bending sections 228 that are connected alternatively and sequentially.

The carrying mechanism 12 has a laminating plane 121 which is configured to carry the composite bi-cell units 221. After the composite bi-cell units 221 are placed on the laminating plane 121, the bending section 228 is bent and thus the plurality of composite bi-cell units 221 in the composite bi-cell belt 22 can be folded successively on the laminating plane 121, and a laminated structure 20 is formed after the plurality of composite bi-cell units 221 are successively laminated on the laminating plane 121.

In other words, in the process that the transferring mechanism 11 transfers the composite bi-cell belt 22 to the laminating plane 121, the composite bi-cell units 221 in the composite bi-cell belt 22 will sequentially and gradually get close to the laminating plane 121, when one of the composite bi-cell units 221 is attached to the laminating plane 121, another composite bi-cell unit 221 thereon can be folded toward and attached to the composite bi-cell units 221 on the laminating plane 121, thus laminating the laminated structure 20 of two pieces of composite bi-cell units 221. Then, another composite bi-cell unit 221 connected to the composite bi-cell unit 221 on the top of the laminated structure 20 through the bending section 228 is also folded toward the composite bi-cell unit 221 located on the top of the laminated structure 20, thereby sequentially laminating the plurality of composite bi-cell units 221, and completing the laminating operation, and then the laminated structure 20 with a plurality pieces of composite bi-cell units 221 is formed.

In addition, the composite bi-cell unit 221 comprises a separator belt 222, a first electrode 226, another separator belt 222 and a second electrode 227 that are arranged sequentially overlapping one another, and in the same composite bi-cell belt 22, the two second electrodes 227 in two adjacent composite bi-cell units 221 are respectively located at the different sides of their own first electrodes 226, so that the first electrode 226 of any one of the composite bi-cell units 221 in the laminated structure 20 is adjacent to the second electrode 227 in another adjacent composite bi-cell unit 221. During the laminating operation the bending of the bending section 228 between adjacent composite bi-cell units 221 is used, and the plurality of composite bi-cell units 221 are successively folded under the action of their own gravity and driven by the transferring mechanism 11, the efficiency of the laminating operation is high, the composite bi-cell unit 221 is not easily deformed, and thus the lamination quality is high.

Taking FIG. 2 for example, the composite bi-cell belt 22, driven by the transferring mechanism 11, transfer the composite bi-cell unit 221 downward in the first direction A, and the composite bi-cell unit 221 on the transferring mechanism 11, similar to the moving slider in a biasing slider mechanism, slides in the first direction A; the multiple composite bi-cell units 221 between the transferring mechanism 11 and the laminating plane 121 are similar to multiple swing rods, and the position where each composite bi-cell unit 221 contacts the laminating plane 121 or the top of the laminated structure 20 is similar to the return center of the swing rods. As shown in FIG. 2, L is the left swing center L of the composite bi-cell units 221 on the top of the laminated structure 20 in FIG. 2 which are swinging backwards, and R is the right swing center R of the folded composite bi-cell units 221 on the top of the laminated structure 20 in FIG. 2. In other words, during the process of folding the composite bi-cell units 221 to the laminating plane 121, a portion of the composite bi-cell units 221 are folded to the laminating plane 121 toward the left side of FIG. 2, and folded around the right swing center R, and a portion of the composite bi-cell units 221 are folded to the laminating plane 121 toward the right side of FIG. 2, and folded around the left swing center L, and the action of alternately folding around the left swing center L and the right swing center R is performed on these composite bi-cell units 221. In addition, the composite bi-cell belt 22 moves downward driven by the transferring mechanism 11, and the multiple composite bi-cell units 221, under the effect of the transferring mechanism 11 and their own gravity, alternately swing around the left swing center L and the right swing center R sequentially, to be sequentially laminated to form the laminated structure 20, and the laminating operation will not easily deform the composite bi-cell unit 221, and the laminating quality is high.

However, in part of existing laminating operation methods, the separator moves back and forth at a high speed, and the cathode piece/anode piece is stacked after each movement, this laminating operation method easily causes wrinkles between the electrodes and the separator, and easily leads to lithium precipitation after the jelly roll is charged and discharged. In addition, due to the high-speed back and forth movement of the separator, this laminating operation method easily causes large changes in the tension of the separator, and easily causes inconsistent deformation of the separator as the friction, inertia and the driving performance of the motors of different machines are different, and then the irreversible deformation of the separator when stretched and the tensile deformation of the micropores of the separator occur, which affect the performance of the electric core. The laminating equipment 10 provided in the present embodiment, through the transferring mechanism 11 and under the action of the gravity of the composite bi-cell units 221, can make the plurality of composite bi-cell units 221 alternately swing around the left swing center L and the right swing center R to be laminated to form the laminated structure 20, and the laminating operation process will not cause the deformation of the composite bi-cell units 221 and achieves high laminating quality. In addition, the laminating speed can be increased by adjusting the transferring speed of the transferring mechanism 11 to achieve high-speed laminating effect.

In the present embodiment, the first direction A is perpendicular to the laminating plane 121, therefore, in the process of transferring the composite bi-cell unit 221 downward, the composite bi-cell unit 221 is attach to the laminating plane 121 in a direction perpendicular to the laminating plane 121, and thereby the bending section 228 is easily bent, and subsequent composite bi-cell units 221 are more easily folded on the laminating plane 121.

In the present embodiment, the center line of the laminated structure 20 in the first direction A passes through the center of the laminating plane 121. Thus, in the process that the plurality of composite bi-cell units 221 alternatively swing around the left swing center L and the right swing center R, the moving amplitude of the composite bi-cell unit 221 swinging in the two directions is symmetric about center line of the laminated structure 20 in the first direction A. In other words, as for the composite bi-cell units 221 that have been folded, the distance between the left swing center L and the lamination center C and the distance between the right swing center R and the lamination center C are both a half of the width of the composite bi-cell unit 221, and thus the symmetry of the laminated structure 20 is improved and the lamination quality of the laminating equipment 10 is enhanced.

It should be explained that in the present embodiment, the laminating plane 121 is integrally a rectangular plane. The center of the above laminating plane 121 can be understood as the intersection point of the diagonals of the rectangular plane. In other embodiments, the laminating plane 121 can be a circular plane or other polygonal planes.

Referring to FIG. 1, in the present embodiment, the transferring mechanism 11 comprises two transferring rollers 111 arranged adjacent to each other, the two transferring rollers 111 transfer the composite bi-cell unit 221 in the first direction A, the distance H from the position where the transferring rollers 111 contact the composite bi-cell unit 221 to the laminating plane 121 in the first direction can be greater than or equal to $$\frac{\sqrt{15}}{2}w,$$

wherein w is the distance between the two ends of the composite bi-cell unit 221 in the extending direction of the composite bi-cell belt 22, i.e., the width of the composite bi-cell unit 221.

Thus, there are at least two composite bi-cell units 221 between the transferring mechanism 11 and the laminating plane 121, which makes it convenient to bend the two composite bi-cell units 221 between the transferring mechanism 11 and the stacking plane 121 toward the lamination center C or the laminating plane 121. As shown in FIGS. 1 and 2, the bending section 228 between the two composite bi-cell units 221 is deflected toward the lamination center C or to the laminating plane 121 while it is bent, so as to alleviate the deviation of the bending section 228 between the two composite bi-cell units 221 from the lamination center C or the laminating plane 121 while it is bent, thereby improving the working stability of the laminating equipment 10.

Referring to FIGS. 2 and 3, FIG. 3 is a structural schematic view of the laminating equipment 10 when it performs the laminating operation in the state that the transferring mechanism 11 is relatively close to the carrying mechanism 12 provided in the embodiment of the present disclosure.

The composite bi-cell units 221 can be flexible, and the distance H from the position where the transferring rollers 111 contact the composite bi-cell units 221 to the laminating plane 121 is greater than or equal to $$\frac{\sqrt{3}}{2}w,$$

as shown in FIG. 3.

Thus, when the transferring mechanism 11 transfers the composite electrode units 221 to the laminating plane 121, the composite bi-cell unit 221 between two transferring rollers 111 and the composite bi-cell unit 221 which is folded toward the laminating plane 121 are bent relative to each other, so that the plurality of composite bi-cell units 221 can be gradually laminated on the laminating plane 121, and the laminating operation is accomplished.

It should be explained that in other embodiments, the carrying mechanism 12 or the transferring mechanism 11 can also be a mechanism that can move along a direction perpendicular to the first direction A. During the laminating operation, the carrying mechanism 12 or the transferring mechanism 11 moves along a direction perpendicular to the first direction A, to alleviate the bending of the composite bi-cell unit 221 and improve the laminating quality. Undoubtedly, when the first composite bi-cell unit 221 is transferred to the laminating plane 121, the movement of the carrying mechanism 12 or the transferring mechanism 11 in the direction perpendicular to the first direction A can be controlled, so that the center point of the composite bi-cell unit 221 first turning to the laminating plane 121 overlaps the lamination center C. Thus, the laminated structure 20 laminated by following multiple composite bi-cell units 221 is more stable and has better lamination quality.

In the present embodiment, the laminating equipment 10 further comprises a lifting mechanism 13 which is connected with the carrying mechanism 12, and the lifting mechanism 13 can drive the carrying mechanism 12 to move along the first direction A, to keep a constant distance between the composite bi-cell unit 221 on the top of the laminated structure 20 and the transferring mechanism 11. Thus, in the process of laminating the composite bi-cell units 221, the distance between the top of the laminated structure 20 and the transferring mechanism 11 keeps constant, and the number of the composite bi-cell units 221 between the top of the laminated structure 20 and the transferring mechanism 11 also keeps constant, so that the upper composite bi-cell units 221 have the same influence on each composite bi-cell unit 221 folded towards the laminating plane 121, and therefore, the laminating operation keeps stable and the quality of the laminated structure 20 is improved.

It should be explained that in the present embodiment, the above phrase "the distance between the top of the laminated structure 20 and the transferring mechanism 11 keeps constant" can have the understanding that the distance between the top surface of the laminated structure 20 and the lower edge of the transferring roller 111 keeps constant.

Optionally, in other embodiments, it can also be that the entirety of the transferring mechanism 11 can move along a vertically upward direction. Thus, the distance between the composite bi-cell unit 221 on the top of the laminated structure 20 and the transferring mechanism 11 can also keep constant. In addition, the above term "the vertically upward direction" can be understood as the direction opposite to the first direction A.

In the present embodiment, the laminating equipment 10 can further comprise a guiding element 14 which is disposed above the laminating plane 121 and located between the transferring mechanism 11 and the laminating plane 121. In conjunction with FIG. 1, when the composite bi-cell belt 22 is bent facing away from the center line of the laminated structure 20 in the first direction A, the guiding element 14 can restrict the bending of the composite bi-cell belt 22 facing away from center line of the laminated structure 20 in the first direction A. For example, during the laminating operation, if the bending section 228 between the two adjacent composite bi-cell units 221 has a poor flexibility and can hardly have relative bending, the guiding element 14 can help the bending of adjacent composite bi-cell units 221.

Optionally, the guiding element 14 can be a moving device. Generally, the guiding element 14 can move towards the direction close to the composite bi-cell belt 22, i.e., the guiding element 14 can move towards the composite bi-cell belt 22 located between the transferring mechanism 11 and the laminating plane 121, which can drive the corresponding composite bi-cell belt 22 to move in a direction close to the center line of the laminated structure 20 in the first direction A, and assist the bending of the composite bi-cell belt 22.

In the present embodiment, the laminating equipment 10 further comprises ribs 122 which are disposed on the carrying mechanism 12 and located at the edge of the laminating plane 121. Thus, the ribs 122 can restrict the composite bi-cell units 221 on the laminating plane 121 from moving out of the laminating plane 121, so that the laminated structure 20 formed by laminating can always be kept within the laminating plane 121. It should be explained that when H is greater than $$\frac{\sqrt{3}}{2}W$$

and less than $$\frac{\sqrt{15}}{2}W,$$

the limiting effect of the ribs 122 is better.

Referring to FIGS. 1-3, in the present embodiment, the number of the ribs 122 is two, which are disposed with an interval therebetween, and the laminating plane 121 is located between the two ribs 122. The two ribs 122 limit the laminated structure 20 in two directions and thus the limiting effect is better.

Optionally, in other embodiments, the laminating equipment 10 can further comprise an absorbing element which can be disposed in the laminating plane 121 and configured to attach the composite bi-cell unit 221 to the laminating plane 121 in the first direction A, thereby limiting the lateral movement of the composite bi-cell unit 221 on the laminating plane 121.

The working principle of the laminating equipment 10 provided by the present embodiment is as follows:

the laminating equipment 10 comprises a transferring mechanism 11 and a carrying mechanism 12, wherein the transferring mechanism 11 is configured to transfer a composite bi-cell belt 22 downward. The composite bi-cell belt 22 comprises thereon a plurality of composite bi-cell units 221 arranged sequentially with an interval therebetween, and two adjacent composite bi-cell units 221 can be connected by bendable bending sections 228. The carrying mechanism 12 has a laminating plane 121 which is configured to carry the composite bi-cell units 221, so that the composite bi-cell belt 22 is folded on the laminating plane 121, and thus the plurality of composite bi-cell units 221 are laminated successively on the laminating plane 121 to form the laminated structure 20. In the process that the transferring mechanism 11 transfers the composite bi-cell belt 22 to the laminating plane 121, the composite bi-cell units 221 in the composite bi-cell belt 22 will sequentially and gradually get close to the laminating plane 121, when one of the composite bi-cell units 221 on the composite bi-cell belt 22 is attached to the laminating plane 121, another composite bi-cell units 221 thereon is folded towards and attached to the composite bi-cell units 221 on the laminating plane 121, to form the laminated structure 20 by laminating two pieces of composite bi-cell units 221, and then, another composite bi-cell unit 221 connected to the composite bi-cell unit 221 on the top of the laminated structure 20 through the bending section 228 is also folded towards the composite bi-cell unit 221 on the top of the laminated structure 20, thereby sequentially laminating the plurality of composite bi-cell units 221 to accomplish the laminating operation and form the laminated structure 20 with a plurality of composite bi-cell units 221. In addition, since each composite bi-cell unit 221 comprises a separator belt 222, a first electrode 226, another separator belt 222 and a second electrode 227 that are arranged sequentially overlapping one another, and in the same composite bi-cell belt 22, the two second electrodes 227 in the two adjacent composite bi-cell units 221 are respectively located at the different sides of their own first electrodes 226, so that the first electrode 226 of any one of the composite bi-cell units 221 in the laminated structure 20 is adjacent to the second electrode 227 in another adjacent composite bi-cell unit 221. The laminating operation uses the bending of the bending section 228 between the adjacent composite bi-cell units 221, and the plurality of composite bi-cell units 221 are successively folded under the effect of their own gravity and driven by the transferring mechanism 11, the efficiency of the laminating operation is high, and the composite bi-cell units 221 are not easily deformed, and thus the lamination quality is high.

To sum up:

the present embodiment provides a laminating equipment 10 which has the advantages of high laminating efficiency and good laminating quality.

Referring to FIG. 4, FIG. 4 is a schematic view of the flow of the laminating method provided in the embodiment of the present disclosure.

The present embodiment further provides a laminating method which is applied to the laminating equipment 10 in the above embodiment, and the laminating method also has the advantages of high laminating efficiency and good laminating quality.

It should be explained that the laminating method provided by the present embodiment has the same principle and renders the same technical effect as those of the above laminating equipment 10, and thus reference can be made to the above corresponding disclosure.

In combination with FIG. 4, the laminating method comprises:

step S100: transferring the composite bi-cell belt 22 downward to the laminating plane 121, so that a plurality of composite bi-cell units 221 are successively laminated on the laminating plane 121 and thus a laminated structure 20 is formed.

Thus, after one composite bi-cell unit 221 on the composite bi-cell belt 22 is attached to the laminating plane 121, another composite bi-cell unit 221 on the composite bi-cell unit 221 continues to be folded towards and attached to the composite bi-cell unit 221 on the laminating plane 121, so as to be laminated to form the laminated structure 20 of two pieces of composite bi-cell units 221. The other composite bi-cell unit 221 connected with the composite bi-cell unit 221 on the top of the laminated structure 20 can also be folded through the bending section 228, and is located on the top of the laminated structure 20 after being folded, thus, a plurality of composite bi-cell unit 221 are successively laminated to accomplish the laminating operation and form the laminated structure 20 with multiple pieces of composite bi-cell units 221. The laminating method uses the bending function of the bending section 228 between the adjacent composite bi-cell unit 221, the driving function of the transferring mechanism 11 and the gravity of the composite bi-cell units 221 themselves to successively laminate a plurality of composite bi-cell units 221, and the efficiency of the laminating operation is high.

The laminating method may further comprise:

step S200: moving the laminating plane 121 downward, to keep a constant distance between the composite bi-cell unit 221 located on the top of the laminated structure 20 on the laminating plane 121 and the transferring mechanism 11.

Thus, the distance between the composite bi-cell unit 221 on top of the laminated structure 20 and the transferring mechanism 11 remains constant, so that the number of the composite bi-cell units 221 between the top of the laminated structure 20 and the transferring mechanism 11 remains constant, and thus the composite bi-cell units 221 above the laminated structure 20 have the same influence on the process that each composite bi-cell unit 221 is folded towards the laminating plane 121. Thus, the stability of the laminating operation can be improved and the quality of the laminated structure 20 can be enhanced.

It should be explained that the direction of transferring the composite bi-cell belt 22 to the laminating plane 121 is the first direction A, and the first direction A can be perpendicular to the laminating plane 121, and the center line of the laminated structure 20 in the first direction A passes through the center of the laminating plane 121. Therefore, in the process that the plurality of composite bi-cell units 221 alternatively swing around the left swing center L and the right swing center R, the moving amplitudes of the composite bi-cell units 221 swinging to the left and to the right are the same, i.e., the distance between the left swing center L and the lamination center C and the distance between the right swing center R and the lamination center C are both a half of the width of the composite bi-cell unit 221. In this way, the plurality of composite bi-cell units 221 on the laminated structure 20 can be more accurately aligned, and the lamination quality of the lamination device 10 can be improved.

To sum up:

the present embodiment provides a laminating method, which also has the advantages of high lamination efficiency, good lamination quality and the like.

Figure 5:
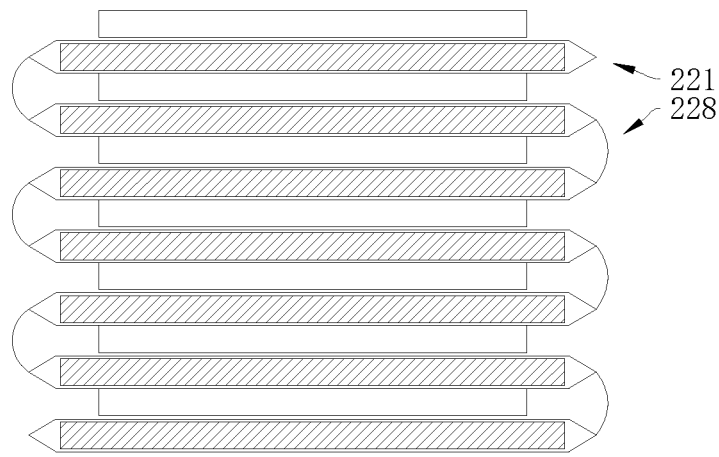
FIG. 5 is a structural schematic view of the laminated structure provided in the embodiment of the present disclosure.
Figure 6:
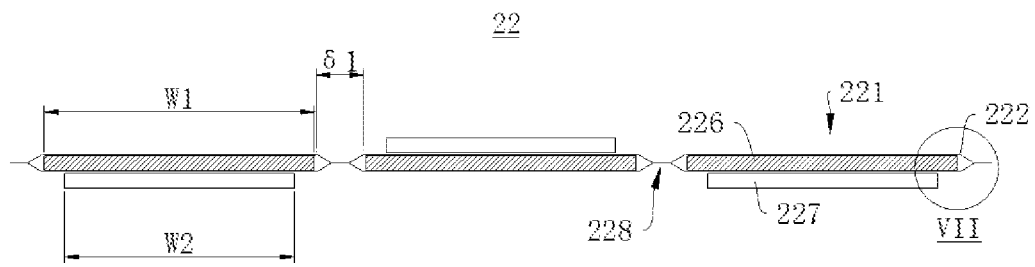
FIG. 6 is a structural schematic view of the composite bi-cell belt of the laminated structure provided in the embodiment of the present disclosure.
Figure 7:
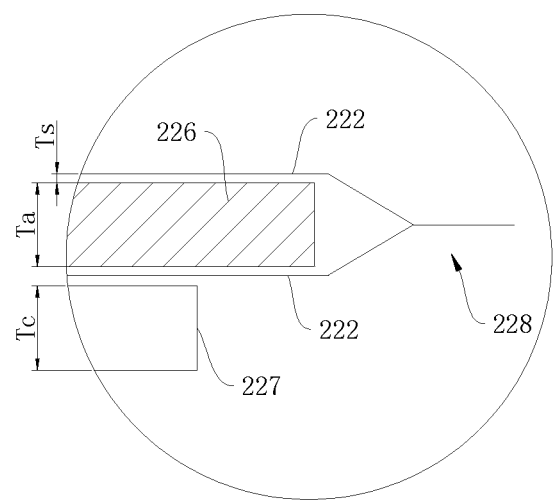
FIG. 7 is an enlarged schematic view of the structure at VII in FIG. 6.

Referring to FIGS. 5, 6 and 7, FIG. 5 is a structural schematic view of the laminated structure 20 provided in the embodiment of the present disclosure. FIG. 6 is a structural schematic view of the composite bi-cell belt 22 of the laminated structure 20 provided in the embodiment of the present disclosure. FIG. 7 is an enlarged schematic view of the structure at VII in FIG. 6.

The present embodiment provides a laminated structure 20 which can be prepared using the above laminating equipment 10 or the laminating method in the above embodiment, which achieves high efficiency in the laminating operation and has the characteristics of relatively high efficiency of laminating operation.

It should be explained that the laminated structure 20 provided by the present embodiment has the same basic principle and renders the same technical effect as those of the above embodiment, and thus reference can be made to the above corresponding disclosure.

The laminated structure 20 consists of a composite bi-cell belt 22 which comprises two separator belts 222, a plurality of first electrodes 226 and a plurality of second electrodes 227, and the plurality of first electrodes 226 are all disposed between the two separator belts 222 and are disposed with an interval therebetween in the extending direction of the separator belts 222, and the plurality of second electrodes 227 are alternately arranged on one sides of the two separator belts 222 respectively away from the first electrodes 226; and the plurality of second electrodes 227 correspond to the plurality of first electrodes 226 one by one, so that the first electrode 226 and the corresponding second electrode 227 form a composite bi-cell unit 221, and the adjacent composite bi-cell units 221 has an interval therebetween, and a section of the separator belt 222 corresponding to the interval is a bending section 228 which can be bent so as to be configured to bend when the plurality of composite bi-cell units 221 are sequentially folded.

In other words, the composite bi-cell units 221 comprise the second electrode 227, the separator belt 222, the first electrode 226 and another separator belt 222 laminated sequentially, and adjacent composite bi-cell units 221 are connected to each other through a section of the separator belt 222, i.e., they are connected by the bending section 228, and in two adjacent composite bi-cell units 221, the second electrode 227 in one of the composite bi-cell units 221 is located at the lower portion, the second electrode 227 in the other composite bi-cell unit 221 is located at the upper portion, and the second electrodes 227 on the composite bi-cell belt 22 are arranged up and down alternatively, and in this way, when a plurality of composite bi-cell units 221 on the composite bi-cell belt 22 are sequentially folded, the second electrodes 227 on the laminated structure 20 are located between the respective first electrodes 226 of the two composite bi-cell units 221.

In the present embodiment, in the height direction of the laminated structure 20, the first electrode 226 of any one of the composite bi-cell units 221 is attached to the second electrode 227 in the adjacent composite bi-cell unit 221.

It should be explained that in the present embodiment, the width of the first electrode 226 is greater than that of the second electrode 227, and the projection of the second electrode 227 on the first electrode 226 is located within the outer contour of the first electrode 226, wherein the width of the first electrode 226 indicates the distance between the two ends of the first electrodes 226 in the extending direction of the corresponding separator belts 222, and the width of the second electrode 227 indicates the distance between the two ends of the second electrodes 227 in the extending direction of the corresponding separator belts 222. However, in other embodiment, the width of the first electrode 226 can also be smaller than that of the second electrode 227, and the projection of the first electrode 226 on the second electrode 227 is located within the outer contour of the second electrode 227.

Figure 8:
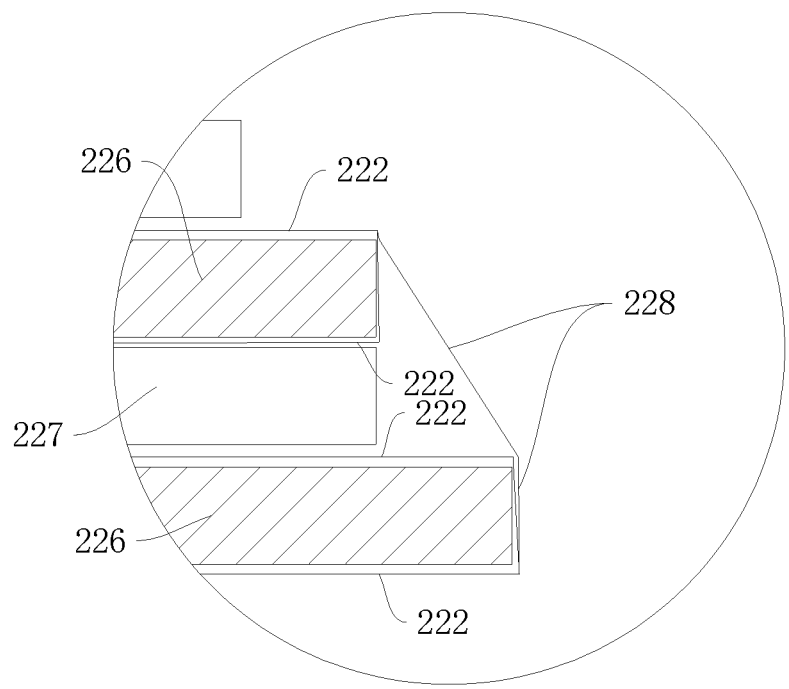
FIG. 8 is a schematic view of partial structure of the laminated structure provided in the embodiment of the present disclosure when two adjacent composite bi-cell units are in a maximum stagger state.
Figure 9:
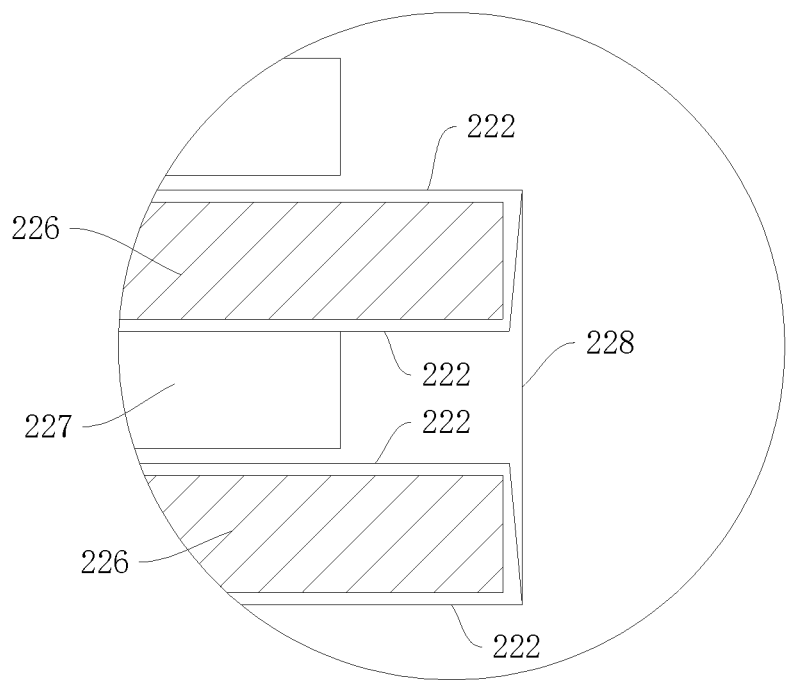
FIG. 9 is a schematic view of partial structure of the laminated structure provided in the embodiment of the present disclosure when two adjacent composite bi-cell units are in an alignment state.

Referring to FIGS. 6, 8 and 9, FIG. 8 is partially structural schematic view of the laminated structure 20 provided in the embodiment of the present disclosure when two adjacent composite bi-cell units 221 are in the maximum stagger state; and FIG. 9 is partially structural schematic view of the laminated structure 20 provided in the embodiment of the present disclosure when two adjacent composite bi-cell units 221 are in an alignment state.

The range of the length δ1 of the bending section 228 can be $\sqrt{(W1-W2)^2+(Ts+Ta+Tc)^2}+3Ts+Ta>\delta1>4Ts+2Ta+Tc+B$.

In the above, W1 is the width of the first electrode 226, W2 is the width of the second electrode 227, Ta is the thickness of the first electrode 226, Tc is the thickness of the second electrode 227, and Ts is the thickness of the separator belt 222, wherein the width of the first electrode 226 indicates the distance between the two ends of the first electrodes 226 in the extending direction of the corresponding separator belts 222, the width of the second electrode 227 indicates the distance between the two ends of the second electrodes 227 in the extending direction of the corresponding separator belts 222, and B is the precision of the bending section 228 and is a positive value.

In the above, when the length δ1 of the bending section 228 is the maximum, as shown in FIG. 8, at this time, the composite bi-cell unit 221 on the upper side deviates to the left, and the first electrode 226 on the upper side and the second electrode 227 on the lower side will be staggered, and the second electrode 227 on the lower side deviates to the left, i.e., when the left edge of the first electrode 226 on the lower side is aligned with the left edge of the second electrode 227 on the lower side, the length of the bending section 228 in FIG. 8 is approximately the sum of the thickness 3 Ts of three pieces of the separator belts 222, the thickness Ta of one piece of the first electrode 226 and the value of the following formula:

$$\sqrt{(W1-W2)^2+(Ts+Ta+Tc)^2}$$

when the length of the bending section 228 is smaller than the maximum, it is difficult for the composite bi-cell unit 221 on the upper side to move to the left, which can prevent the first electrode 226 on the upper side from staggering the second electrode 227 on the lower side, and ensure that the laminated structure 20 has good alignment.

When the length δ1 is the minimum, i.e., the circumstance as shown in FIG. 9, at this time, the composite bi-cell unit 221 on the upper side is aligned with the composite bi-cell unit 221 on the lower side. The length of the bending section 228 in FIG. 9 is 4Ts+2Ta+Tc+B. In this way, it can be ensured that the two composite bi-cell units 221 respectively on the upper side and on the lower side are aligned, and the bending section 228 will not have much stretch and deformation, and thus the quality of the laminated structure 20 can be improved.

To sum up:

the present embodiment provides a laminated structure 20, which has advantages of high efficiency of laminating operation and the like.

The above-mentioned are merely for some embodiments of the present disclosure and not intended to limit the present disclosure, and for one skilled in the art, in the case of no conflict, the features in the above embodiments can be combined with each other, and various modifications and changes may be made to the present disclosure. Any modifications, equivalent substitutions, improvements and so on made within the spirit and principle of the present disclosure should be covered within the scope of protection of the present disclosure. In addition, the embodiments should be regarded as exemplary instead of limitation, and the scope of the present disclosure is defined by the appended claims rather than the above description, and therefore, it is intended that all changes falling within the meaning and scope of equivalent elements of the claims are included in the present disclosure. Any reference signs in the claims should not be regarded as limiting the claims involved.

INDUSTRIAL APPLICABILITY

To sum up, the present disclosure provides laminating equipment, method and a laminated structure, which have the advantages of high laminating efficiency and good laminating quality.

What is claimed is:

1. A laminating equipment, comprising: a transferring mechanism and a carrying mechanism, wherein
the transferring mechanism is configured to transfer a composite bi-cell belt downward, wherein the composite bi-cell belt is provided thereon with a plurality of composite bi-cell units arranged sequentially with an interval therebetween, and two adjacent composite bi-cell units are connected to each other through a bendable bending section, and each of the composite bi-cell units comprises a separator belt, a first electrode, another separator belt, and a second electrode that are arranged sequentially overlapping one another;
the carrying mechanism has a laminating plane, wherein the laminating plane is configured to carry the composite bi-cell units, so that the plurality of composite bi-cell units are laminated one by one on the laminating plane, so as to form a laminated structure, and in the laminated structure, the first electrode in any one of the composite bi-cell units is adjacent to the second electrode in another composite bi-cell unit adjacent thereto;
the transferring mechanism comprises two transferring rollers arranged adjacent to each other, and the two transferring rollers are configured to transfer the composite bi-cell units to the laminating plane along a first direction; the laminating equipment further comprises a lifting mechanism, wherein the lifting mechanism is connected with the carrying mechanism; and the lifting mechanism is configured to lift the carrying mechanism to move in a vertically downward direction so that a distance H from a position, at which the transferring rollers contact the composite bi-cell units, to the laminating plane in the first direction is greater than $$\frac{\sqrt{15}}{2}W,$$

and less than $$\frac{\sqrt{3}}{2}W,$$

wherein W is a width of each of the composite bi-cell units.

2. The laminating equipment according to claim 1, wherein a direction along which the transferring mechanism transfers the composite bi-cell belt is a first direction, and the first direction is perpendicular to the laminating plane.

3. The laminating equipment according to claim 2, wherein a center line of the laminated structure in the first direction passes through a center of the laminating plane.

4. The laminating equipment according to claim 1, wherein the transferring mechanism is able to move entirely in a vertically upward direction, so as to keep a constant distance between a composite bi-cell unit on a top of the laminated structure and the transferring mechanism.

5. The laminating equipment according to claim 1, wherein the laminating equipment further comprises a guiding element, wherein the guiding element is arranged between the transferring mechanism and the laminating plane, and the guiding element is configured to guide the composite bi-cell units to bend relative to the bending section.

6. The laminating equipment according to claim 5, wherein the guiding element is able to move in a direction toward the composite bi-cell belt, so as to help two adjacent composite bi-cell units bend relative to each other.

7. The laminating equipment according to claim 1, wherein the laminating equipment further comprises an absorbing element, wherein the absorbing element is arranged on the laminating plane, and the absorbing element is configured to attach the composite bi-cell units.

8. The laminating equipment according to claim 1, the laminating equipment further comprises ribs, wherein the ribs are arranged on the carrying mechanism, the ribs are located at edges of the laminating plane, and the ribs are configured to restrict the composite bi-cell units located on the laminating plane from moving out of the laminating plane.

9. The laminating equipment according to claim 8, wherein two ribs are provided, the two ribs are provided with an interval therebetween, and the laminating plane is located between the two ribs.

10. A laminating method using the laminating equipment according to claim 1, and the laminating method comprises:
    transferring the composite bi-cell belt downward to the laminating plane, so that the plurality of composite bi-cell units are successively laminated on the laminating plane, so as to form a laminated structure.

11. The laminating method according to claim 10, wherein the laminating method further comprises:
    lifting the laminating plane downward, so as to keep a constant distance between a composite bi-cell unit on a top of the laminated structure and the transferring mechanism.

12. A laminated structure, wherein the laminated structure is manufactured by the laminating equipment according to claim 1, and the laminated structure consists of the composite bi-cell belt, wherein the composite bi-cell belt comprises two separator belts, a plurality of first electrodes and a plurality of second electrodes, wherein
    the plurality of first electrodes are all arranged between the two separator belts and arranged with an interval therebetween along an extending direction of the separator belts;
    the plurality of second electrodes are alternately arranged on one sides of the two separator belts away from the first electrodes, and the plurality of second electrodes correspond to the plurality of first electrodes one by one, so that each of the first electrodes and a corresponding second electrode form a composite bi-cell unit, adjacent composite bi-cell units are arranged with an interval therebetween, and a section of a separator belt corresponding to the interval is a bending section, wherein the bending section is able to be bent, so as to be configured to be bent when the plurality of composite bi-cell units are successively folded; and
    wherein a length $\delta 1$ of the bending section is in a range of:

$$-\sqrt{(W1-W2)^2+(Ts+Ta+Tc)^2}+3Ts+Ta > \delta 1 > 4\ Ts+2Ta+Tc+B,$$

wherein W1 is a width of each of the first electrode, W2 is a width of each of the second electrode, Ta is a thickness of each of the first electrode, Tc is a thickness of each of the second electrode, and Ts is a thickness of each of the separator belts, wherein the width of each of the first electrode indicates a distance between two ends of each of the first electrode in a extending direction of corresponding separator belts, the width of each of the second electrode indicates a distance between two ends of each of the second electrode in a extending direction of corresponding separator belts, and B is a precision of the bending section.

13. The laminated structure according to claim 12, wherein in a height direction of the laminated structure, a first electrode in any one of the composite bi-cell units is attached to a second electrode of an adjacent composite bi-cell unit.

14. The laminating equipment according to claim 1, wherein a direction along which the transferring mechanism transfers the composite bi-cell belt is a first direction, and the first direction is perpendicular to the laminating plane.

15. The laminating equipment according to claim 1, wherein a direction along which the transferring mechanism transfers the composite bi-cell belt is a first direction, and the first direction is perpendicular to the laminating plane.

16. The laminating equipment according to claim 1, wherein each of the first electrodes has a width greater than that of a corresponding second electrode, and a projection of each of the second electrodes on a corresponding first electrode is located within an outer contour of the corresponding first electrode.

17. The laminated structure according to claim 12, wherein each of the first electrodes has a width greater than that of a corresponding second electrode, and a projection of each of the second electrodes on a corresponding first electrode is located within an outer contour of the corresponding first electrode.

* * * * *